(12) United States Patent
McBurney et al.

(10) Patent No.: US 6,670,915 B1
(45) Date of Patent: Dec. 30, 2003

(54) SYNTHETIC NAV-DATA FOR A HIGH-SENSITIVITY SATELLITE POSITIONING SYSTEM RECEIVER

(75) Inventors: Paul W. McBurney, San Francisco, CA (US); Akira Kimura, San Francisco, CA (US)

(73) Assignees: eRide, Inc., San Francisco, CA (US); Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/246,289

(22) Filed: Sep. 17, 2002

(51) Int. Cl.[7] .............................................. H04B 7/185
(52) U.S. Cl. ............................ 342/357.12; 342/357.09
(58) Field of Search ......................... 342/357.12, 357.9

(56) References Cited

U.S. PATENT DOCUMENTS 5,812,087 A * 9/1998 Krasner ................... 342/357.1

2002/0190898 A1 * 12/2002 Abraham et al. ...... 342/357.09

* cited by examiner

Primary Examiner—Thomas H. Tarcza
Assistant Examiner—Fred H Mull

(57) ABSTRACT

An SPS receiver comprises a radio receiver for measuring pseudoranges to orbiting SPS satellites, a local real time clock accurate within three seconds of true SPS system time, and a communication channel to receive NAV-data rebroadcasts from a server. Such server is associated with its own private navigation receiver that has direct satellite signal reception that is strong enough to reliably demodulate the SPS system NAV-data. The SPS receiver synthesizes its own NAV-data from time information provided by the local real time clock and almanac and ephemeris data provided by the server in the rebroadcast. Thus the SPS receiver can operate in weak signal environments that would otherwise be impossible.

10 Claims, 2 Drawing Sheets

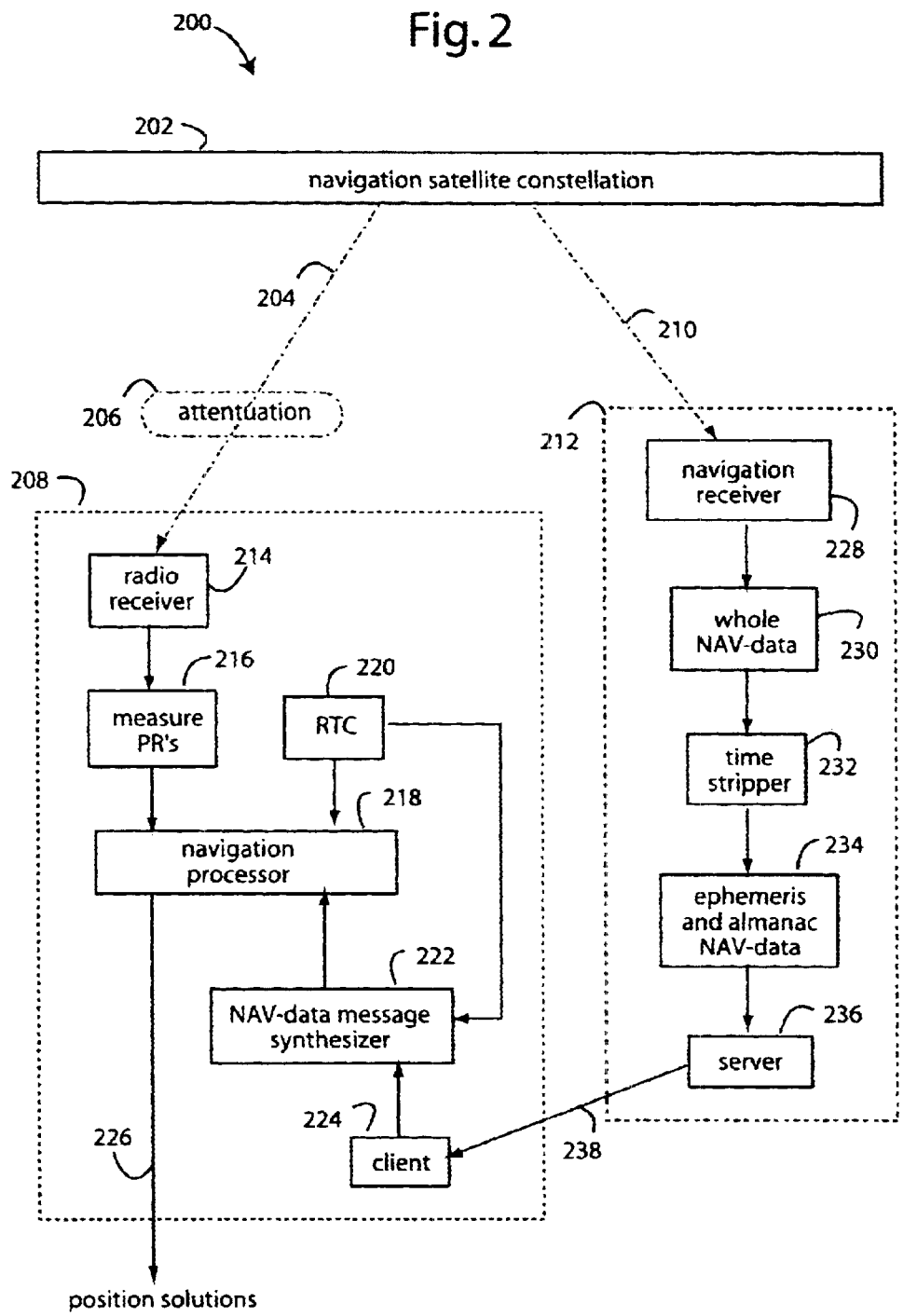

SYNTHETIC NAV-DATA FOR A HIGH-SENSITIVITY SATELLITE POSITIONING SYSTEM RECEIVER

FIELD OF THE INVENTION

Figure 1:
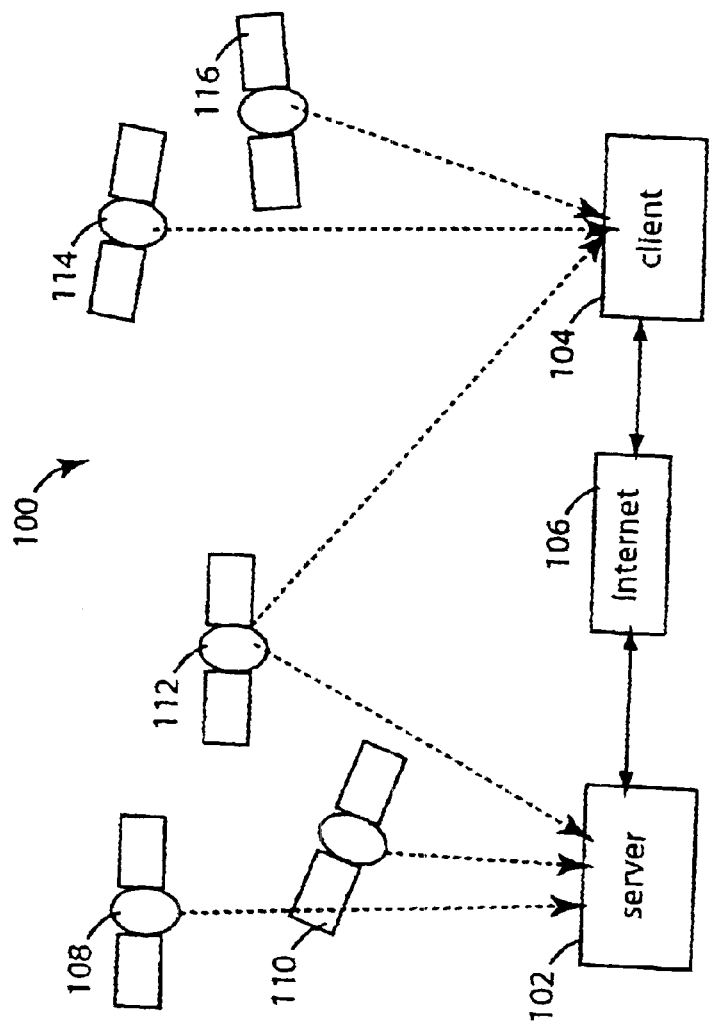

The present invention relates to navigation satellite receivers, and more particularly to methods and systems for assisting a navigation receiver initialization with system-time information.

DESCRIPTION OF THE PRIOR ART

Global positioning system (GPS) and satellite positioning system (SPS) receivers use signals received from several earth-orbiting satellites in a constellation to determine user position and velocity, and other navigational data. A navigation receiver that has just been turned on does not yet know where it is, how much its crystal oscillator is in error, nor what time it is. It may however, know time to within three seconds or better, and its rough position to within a hundred kilometers. The exact time and satellite carrier frequencies are needed to find and lock onto the satellite transmissions, and so a search must be made of all the possibilities. Reducing the range of possibilities will lead directly to quicker initializations a first position fix.

A GPS receiver that is associated with a cellphone or that can communicate over the Internet can be assisted in many ways by network servers connected to other GPS receivers that already have satellite-lock and are tracking. A telephone or network communication channel can be used to contribute key bits of information to a navigation receiver to help it initialize faster. One of the present inventors, Paul McBurney, and others, have recently filed several United States Patent Applications that relate to aiding GPS receiver clients. These are summarized in Table I, and all such patent applications have been assigned to the same Assignee, and are incorporated herein by reference.

The GPS satellites transmit a 50-bps navigation (NAV) data message that repeats every 12.5 minutes. It comprises system time, satellite ephemeris, and almanac information that is critical to a GPS receiver in acquiring signal lock on enough satellites and producing its navigation solutions. There are twenty-five frames that each take 30-seconds, each frame has five subframes, and each subframe has ten words. A Z-count at the beginning of each subframe gives its transmission time from the satellite. Ephemeris is the first three subframes, and subframes 4–5 are almanac data spread over fifty pages. One whole data frame of NAV data is 1500-bits long, and thus takes thirty seconds to transmit.

The NAV-data cannot be reliably received and demodulated if its signal level is too weak. Such can occur indoors or below decks. So high sensitivity receivers need to receive informational assistance from a third party over a different channel that contributes current NAV-data. If local-receiver system-time is known, the z-count information can be plugged into an otherwise generic NAV-data message obtained from the third party.

Each data frame is divided into five subframes 1–5, and each subframe is 300-bits long, e.g., ten 30-bit words. Thus it takes six seconds to transmit each 300-bit, 10-word subframe. Every subframe starts with a telemetry (TLM) word of 30-bits, followed by a hand-over word (HOW) of 30-bits. Both 30-bit words comprise 24-bits of data and 6-bits of parity. There are eight words of data payload in each subframe.

The TLM word at the front of each 300-bit subframe begins with an 8-bit preamble. The preamble allows the start of a subframe to be recognized, and thereafter provides a primary mechanism for the receiver to be synchronized.

The first 300-bit subframe transmits the satellite vehicle (SV) clock correction data after the TLM word and HOW. The second subframe transmits the first part of the SV-ephemeris data. The third subframe transmits the second part of the SV-ephemeris data. Subframes four and five are used to transmit different pages of system data. The fourth

TABLE I

| Docket Number | Title | Inventors | USPTO Filing Date | USPTO Serial No. |
|---|---|---|---|---|
| 734-01 | Satellite Navigation Receiver and Method of | P. McBurney, A. Woo | 11 Oct. 2000 | 09/687,044 |
| 734-02 | Infrastructure-Aiding for Satellite Navigation Receiver and Method | P. McBurney, A. Woo | 28 Feb. 2001 | 09/797,521 |
| 734-03 | High sensitivity GPS Receiver and Reception | P. McBurney, A. Woo | 19 Feb. 2002 | 10/079,245 |
| 734-04 | Total Correction Strategy | Stephen J, Edwards, P.McBurney | 19 Feb. 2002 | 10/079,217 |
| 734-05 | Method and System for Position Calculation from Calculated Time | S.Edwards, P.McBurney | 19 Feb. 2002 | 10/079,244 |
| 736-06 | Computing Network Path Delays so Accurate Absolute Time can be Forwarded from a Server to a Client | H.Matsushita, P.McBurney | 19 Feb. 2002 | 10/079,251 |
| 736-07 | No Preamble Frame Sync | Akira Kimura, P.McBurney | 19 Feb. 2002 | 10/079,250 |
| 736-08 | Thin Client | P.McBurney, C.Rasmussen, F.Vaucher, K.Victa | 19 Feb. 2002 | 10/079,249 |
| 736-09 | Software Crystal Oscillator | H.Matsushita, P.McBurney | 19 Feb. 2002 | 10/079,248 |
| 738-10 | High Sensitivity Infrequent Use of Sensors | P.McBurney, K.Victa | 19 Feb. 2002 | 10/079,247 |
| 738-11 | Real Time Clock | P.McBurney | 19 Feb. 2002 | 10/079,253 |
| 738-12 | Shared Reference Station | C.Rypinski, M.Junkar | 19 Feb. 2002 | 10/079,252 | subframe also begins with the TLM word and HOW, and the data payloads rotate over 12.5 minutes to transmit the lengthy information about the ionosphere, UTC, and other data. An entire set of twenty-five frames (125 subframes) makes up the complete Navigation Message that is sent over such 12.5 minute period. The fifth subframe begins with the TLM word and HOW, and its data payload also rotates over 12.5 minutes to transmit the rather large almanac.

The clock data parameters describe the SV-clock and its relationship to GPS time. The ephemeris data parameters describe SV-orbits for short sections of the satellite orbits. Normally, a receiver gathers new ephemeris data each hour, but it can use old data for up to four hours without much error. The ephemeris parameters are used with an algorithm that computes the SV position for any time within the period of the orbit described by the ephemeris parameter set. The almanacs are approximate orbital data parameters for all SV's. The ten-parameter almanacs describe SV orbits over extended periods of time, and is sometimes useful for months.

The signal-acquisition time of a GPS receiver at start-up can be significantly speeded by having the current almanac available. The approximate orbital data is used to preset the receiver with the approximate position and carrier Doppler frequency of each SV in the constellation.

Norman F. Krasner describes a way to deal with NAV-data messages that cannot be read because the carrier signal levels are too weak, in METHOD AND APPARATUS FOR SATELLITE POSITIONING SYSTEM BASED ON TIME MEASUREMENT, U.S. Pat. No. 6,239,742 B1, issued May 29, 2001. A base station is used to record parts of the NAV-data message and these are compared to similar data from a remote SPS receiver. The remote SPS receiver receives parts of the NAV-data message directly from satellites visible to it. The NAV-data recorded by the base station includes with it correct time identification, so matching up the two overlapping-in-time parts can assist the remote SPS receiver in finding its correct system time. Such comparison is not done at the remote mobile receiver, but rather back at the base station.

SUMMARY OF THE INVENTION

It is therefore an object of the present invention to provide a method and system for assisting navigation satellite reception and receiver initialization of GPS and SPS receivers.

It is another object of the present invention to provide a method and system for reducing the time necessary for GPS and SPS receivers to initialize.

It is a further object of the present invention to provide a satellite-navigation system that is cost effective.

Briefly, an SPS receiver embodiment of the present invention comprises a radio receiver for measuring pseudoranges to orbiting SPS satellites, a local real time clock accurate within three seconds of true SPS system time, and a communication channel to receive NAV-data rebroadcasts from a server. Such server is associated with its own private navigation receiver that has direct satellite signal reception that is strong enough to reliably demodulate the SPS system NAV-data. The SPS receiver synthesizes its own NAV-data from time information provided by the local real time clock and almanac and ephemeris data provided by the server. Thus the SPS receiver can operate in weak signal environments that would otherwise be impossible.

An advantage of the present invention is that a system and method are provided that provides for initialization of GPS receivers in attenuated signal environments that would otherwise not be able to initialize.

Another advantage of the present invention is that a system and method are provided for reducing the cost navigation satellite receivers associated with mobile cellular telephones.

These and other objects and advantages of the present invention will no doubt become obvious to those of ordinary skill in the art after having read the following detailed description of the preferred embodiments which are illustrated in the various drawing figures.

IN THE DRAWINGS

FIG. 1 is a functional block diagram of a client-aided Doppler estimation system embodiment of the present invention wherein a cell site is assisting a mobile cellphone with Doppler information communicated over a wireless communications channel; and FIG. 2 is a functional block diagram of a SPS receiver and system method embodiment of the present invention.

DETAILED DESCRIPTION OF THE PREFERRED EMBODIMENT

FIG. 1 illustrates a network system 100, in an embodiment of the present invention, that includes a reference-station server system 102, a user client system 104, and an intervening computer network 106 such as the Internet. The server system 102 includes a navigation satellite receiver that has locked onto and is tracking a constellation of navigation satellites 108, 110, and 112. Some of these may also be visible to the client system 104. Another constellation of navigation satellites, including 114 and 116 is visible to client system 104. The client system 104 includes its own navigation satellite receiver, but such may not have yet locked onto and be tracking its constellation of navigation satellites 112, 114, and 116.

The server system 102 is intended to be always on and and 112. It is then able to discern accurate, absolute system time and may also provide current ephemeris, troposphere, ionosphere, and other information to other, not-yet-initialized navigation satellite receivers connected as network clients. Such information all needs to be determined during initialization, and spoon feeding any of it from another source will dramatically improve time-to-first-fix.

In particular, the server system 102 stores the 12.5 minute repeating NAV data message. It can forward parts of this on request to the client system 104. Such allows the client system 104 to do pattern matching of NAV data it receives with the stored-and-forwarded NAV data. The client system 104 can thereby synchronize to the NAV data frames even before receiving its first preamble in its first TLM word.

The client system 104 will typically have its own 24-bit millisecond clock (Msec24) that starts at zero when its power is turned on. Each epoch of the GPS C/A-code is one millisecond. The server system 102 will know GPS time, and have the Z-count. The Z-count is a 29-bit binary number that represents a fundamental GPS time unit. The ten most significant bits carry the GPS week number, and the nineteen least significant bits give the time of week (TOW) count in units of 1.5 seconds. A much finer gauge of the system time is available once the receiver locks onto a few GPS satellites. Prior art devices have depended on determining the Z-count during initialization.

What specifically needs to be determined during the initialization of client system 104 is how much of an offset needs to be added to the client's local clock, e.g., Msec24, to equal GPS time. This will dictate the correct NAV data frame synchronization. The time required to achieve such synchronization will be dramatically reduced in the client system 104 if a subframe that has just been received is used as a template to search the sequential record of subframes the server system 102 has observed.

Alternatively in situations where the per-byte cost of communicating over the network is relatively high, it will be more economical for the client system 104 to forward the signal snapshots it has gathered to the server system 102. The server system then has the job to find any pattern matches. In such cases, the server system 102 then sends data that helps the client identify the current integer millisecond to use.

In such alternative, the server system 102 preferably saves the NAV-data subframes for every SV the reference station tracks. It then estimates the network latency that exists between itself and the several network clients 104. This enables an estimate of GPS-time to be made for each client. Such GPS-time then indicates which portion of the NAV-data subframes should be currently observed at the client. The server system copies these NAV-data subframes, rewrites the z-count, and appends parity bits in the HOW-word before sending it to the client.

In a method embodiment of the present invention, the client system 104 gets approximate GPS time from the server system 102, e.g., to within a second or two of true GPS time. There will be some network path delays over network 106 between the server system 102 and the client system 104. And such delays are accounted for.

The client system 104 requests NAV data subframes from the server system 102 by specifying a GPS time of interest, e.g., a particular millisecond interval. The server system 102 fetches a corresponding set of subframe patterns from its database. It rewrites the HOW word with the expected Z-count, and adds appropriate parity bits. The requested subframes are sent over the network 106.

The client system 104 uses a 30-bit long moving window to inspect the subframe data provided by the server system 102, and tries to find a match with what it has just received directly from an SV. If there is no match, the window is shifted one bit, and the 30-bit words are compared again-and-again. When a 30-bit match is found, the preceding and following words are also tested for verification. Finding matches there too will indicate frame synchronization has been found. The offset time can then be computed and added to Msec24 to initialize the client system 104 with GPS time. More precisely, the Z-count is extracted from the current HOW word in the NAV subframe data.

In general, embodiments of the present invention rely on a pattern-matching technique. Certain patterns are a problem, so it is necessary to reject unreliable bit patterns like "FFFFFF", "000000", "AAAAAA", "555555". Such patterns commonly appear in unlaunched SV or undefined almanac pages. Another pattern-matching problem is caused by bit reversals.

The typical receiver firmware sometimes fails to detect phase reversal of NAV data when the signal is too weak. If the receiver fails to detect the change, all the bits following the change will need to be flipped. Therefore some bit-phase reversal should be expected. According to observations, as many as thirty phase reversals can occur. The TLM word marks the head of subframe and appears every ten 30-bit words. The HOW word follows and carries the top 17-bits of Z-count, and the preceding 2-bits at the tail of Word-10 is always "00". Since in these areas NAV pattern is very similar, we can't match with TLM pattern if the search window exceeds ten words.

After getting approximate time, client 104 requests subframe data from server 102 in advance. The GPS time returned to client 104 will have been indeterminately delayed by the latency of network 106, e.g., and so has $\sigma_{latency}$ ambiguity.

In one embodiment, the NAV packet is sent as a group packet with a maximum two-second latency, e.g., group NAV interval (1,000 msec)+maximum NAV packet length (1,000 msec). Thus client 104 should request a subframe with starting time=expected NAV packet reception time−($\sigma_{latency}$+2 sec.).

Taking into account the latency by the network and system response, a decision is made for an adequate word length to be sent to client 104. Consider, $$n/2(\text{word}) \times 30\text{bits} \times 20\text{msec} > \Delta t_t - \Delta \hat{t} + \text{pkt\_size} \times 20\text{msec}$$

$$\Delta t_t - \Delta \hat{t} = (n/2 \times 30 - \text{pkt\_size})20$$

$$\text{where} \begin{cases} n: \text{words}(10-50) \\ \Delta t_t: TrueLatency[\text{ms}] \\ \Delta \hat{t}: EstimatedLatency[\text{ms}] \end{cases}.$$

The NAV data stream repeats itself every fifty words, or five subframes numbers 1–5. If the server 102 sends more than ten words, a TLM word cannot be used to match because the pattern of TLM word repeats every beginning of subframe.

In one embodiment, once the frame is synchronized, GPS time can be determined by counting bits from the end of next HOW word and beginning of the NAV packet. The HOW word carries 17-bits of truncated Z-count. The offset from the end of the HOW word to beginning of next subframe is 240 bits, e.g., 4800 msec. Subtracting such offset from next subframe produces current GPS time. E.g., GPSTime(@msec24)=Zcount×6000−(offset+240)×20−70[msec].

The exact transmission propagation time between SV and surface of the earth is difficult to know, so a default value of 70-milliseconds seems reasonable because using it as a start gives a ±10 milliseconds ambiguity.

The integer millisecond ("intMsec") represents the pseudorange between user position and SV position. When computing GPS time for a first Z-count event, intMsec is assumed to be 70 milliseconds. The offset time between the msec24 variable and GPS time ("offGpsMsec") is then calculated. After the first Z-count event, that event doesn't apply for GPS time adjustment, but is used for only intMsec calculation. Based on offGpsMsec, integer millisecond (intMsec) for each SV is solved using the following equations. GPS time and offGpsMsec are adjusted by solving for time bias in a position-fix routine. E.g., offGps*Msec*=Zcount×6000−{msec24+(offset+240)×20}−70[msec]

int*Msec*=Zcount×6000−{msec24+(offset+240)×20}−offGps*Msec*.

In preferred no-preamble sync method embodiments of the present invention, a fall-back TLM-preamble sync detection process is included just-in-case the pattern-matching fails. Both schemes simply set the synchronized position, e.g., word ID, subframe ID, page ID, and the current Z-count. So the two schemes can independently co-exist. When support is available to client 104 from server 102, the pattern-matching technique is tried first. Then using the TLM word preamble for synchronization is tried. If either scheme succeeds, a receiver can smoothly shift the decoding. The frame edge can therefore generally be synchronized inside of six seconds from power-up, even if a suitable bit pattern is not available for no-preamble sync pattern matching.

The reference station server 102 supports such no-preamble sync pattern matching by saving the subframe data for each SV. It estimates network latency and speculates the GPS time on client 104. The server 102 retrieves the corresponding subframe data that centers on the client GPS time. It rewrites the Z-count in the HOW word and encodes subframe data in packets sent to the client 104.

Each such subframe data received on reference station is stored in the database. The subframe data to be stored includes 5,780 bytes of ephemeris data, and 3,000 bytes of almanac data, e.g.,

```
ephemeris = 3(subframes)*10(words)*24bits(w/o parity) *32(SV)
    *2(pre/current IODE);
almanac = 25(pages) *2(SF)*10(words) *24bits(w/ parity)
    *2(pre/current).
```

Since the NAV stream from the SV repeats, all the NAV bits do not need to be stored. The server can ignore some subframe data and all the word parity bits. When the system ephemeris changes, the no-preamble pattern matching will fail until both the reference station server 102 and client 104 actually receive the new ephemeris subframes. The same is true for system almanac changes. Sometimes it takes over twelve hours for the almanac data from all SV's to be completely updated to new almanac set. So both the previous and current almanac data must be stored in the database.

The client 104 initializes by getting subframe data from the server 102 coincident with current GPS time. To do this, the server 102 approximates GPS time the information packets transmitted over network 106 will actually be received by the client 104. How close the time is depends on how accurate the server can estimate GPS time on the client, and also the size of the word data to be sent to the client. If the server can estimate client GPS time within ±3 seconds, it's possible to synchronize the NAV frame within ten data words, e.g., one subframe.

After estimating the GPS time at client 104, the server 102 retrieves in the database and gets the appropriate subframe data corresponding to that current GPS time. Since there are two sets of ephemeris and almanac, the server 102 should track which data set should be used by SV. In encoding the information words, the subframe data from WORD-1, and the TLM word are needed. The parity bits depend on the last 2-bits of previous word data, and the last bits of both the HOW and WORD-10 are "00".

It is important to rewrite HOW word. The server knows the current GPS time, so it can modify the Z-count in HOW word and fix the associated parity bits. The server 102 preferably sends a starting-word identification (ID) and ten 30-bit words of data.

FIG. 2 shows an SPS receiver and support system embodiment of the present invention, and is referred to herein by the general reference numeral 200. The system 200 receives microwave signal transmissions from an overhead constellation of SPS satellites 202. A signal 204 is reduced in strength during its flight by an attenuation 206, e.g., by a building when indoors. A high-sensitivity SPS receiver 208 nevertheless is able to work with such signal, even though highly attenuated. One consequence of the attenuation is the 50-Hz NAV-data message may not be discernable or reliable. So it must be obtained by alternative means in all embodiments of the present invention. For example, from a reference station 212.

However, the pseudoranges can be directly measured by SPS receiver 208 because long sample periods can be collected and worked to take advantage of correlation processing gains. A radio receiver 214 tunes to such transmissions and a correlation processor 216 extracts the various pseudoranges to the visible satellites. A navigation processor 218 gets time information from a real-time clock (RTC) 220 and the z-count, ephemeris, and almanac NAV-data information from a NAV-data synthesizer 222. U.S. patent application Ser. No. 10/079,253, filed Jan. 19, 2002 provides more detail on the construction and use of such an RTC.

The NAV-data synthesizer 222 is unique to embodiments of the present invention. It reconstructs a suitable 25-frame NAV-data message that would have been received by radio receiver 214 if the attenuation 206 had not been so severe. The remote reference station 212 does not provide time information to the client 224, only current ephemeris and almanac data. Since the communication channel with the remote reference station 212 will typically be much higher bandwidth than 50-Hz, the current ephemeris and almanac data can be transferred in far less time than the normal 12.5 minutes it takes the satellites 202 to transmit it.

A client 224 receives only the ephemeris, and almanac NAV-data information. The z-count and timing information is computed by NAV-data synthesizer 222 and by reading the time from RTC 220. The NAV-data synthesizer 222 formats the combined information into a message that the navigation processor 218 can accept and work with naturally.

It is important that the RTC 220 be accurate to within three seconds, otherwise the z-count cannot be correctly written into the synthesized NAV-data because of integer ambiguities. A position solution output 226 is therefore possible from the navigation processor 218. This is especially true when combined with the other inventions and technologies developed by the present inventors and already incorporated herein by reference.

The remote reference station 212 comprises its own complete navigation receiver 228 that is routinely and continuously tracking the navigation satellite constellation 202. A whole NAV-data message 230 is extracted over the 12.5 message transmission time and then stored in a local memory. A time-stripper 232 removes the timing information, e.g., z-count. An ephemeris and almanac NAV-data 234 is distilled and available to a network server 236. A network connection 238 allows the client 224 to request assistance. The server 236 responds with the current ephemeris and almanac NAV-data.

Alternatively, any communication channel can be used in lieu of client 224, network 238, and server 236. For example, wireless connections can provide good results through cellular telephones and communications satellites.

In a business model embodiment of the present invention, the owner/user of SPS receiver 208 is charged a per-use fee or subscription charge for such NAV-data aiding information by the operator of the remote reference station 212.

As a result, all embodiments of the present invention are particularly well suited for use indoors and elsewhere where the signal levels drop below −145 dbm.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A satellite positioning system (SPS) receiver, comprising:

a navigation satellite signal receiver for receiving transmissions directly from orbiting SPS satellites and for measuring their pseudoranges;

a real time clock (RTC) accurate to within three seconds of true SPS system time;

a communications receiver for receiving rebroadcasts of SPS system NAV-data obtained by a remote server; and a NAV-data synthesizer connected to the RTC and the communications receiver, and for providing reconstructions of NAV-data that are otherwise impossible to receive directly through the navigation satellite signal receiver, and that convert time information from the RTC, and almanac and ephemeris data from said rebroadcasts of SPS system NAV-data, to build a complete 12.5-minute-long synthesized NAV-data message;

wherein, position solutions can be derived from said pseudoranges and said synthesized NAV-data message.

2. The SPS receiver of claim 1, wherein:

the communications receiver includes a cellular telephone and wirelessly connects to said remote server.

3. The SPS receiver of claim 1, wherein:

the communications receiver includes a network client and logs-on through the Internet to said remote server.

4. A method of operating an SPS receiver in signal environments too weak to directly receive NAV-data transmissions from orbiting SPS satellites, the method comprising the steps of:

maintaining a local independent time reference;

measuring pseudoranges directly to a constellation of SPS satellites;

receiving ephemeris and almanac aiding information on a secondary communications channel from a reference station;

reconstructing a NAV-data message from a combination of said local independent time reference and said ephemeris and almanac aiding information; and computing a position solution from said NAV-data message and said pseudoranges.

5. The method of claim 4, wherein:

the step of maintaining is such that said local independent time reference provides an accuracy of better than three seconds of true SPS system time.

6. The method of claim 4, wherein:

the step of measuring comprises using correlation gains to read attenuated SPS satellite transmissions.

7. The method of claim 4, wherein:

the step of receiving ephemeris and almanac aiding information is such that said secondary communications channel is a computer network with a client and server.

8. The method of claim 4, wherein:

the step of receiving ephemeris and almanac aiding information is such that said secondary communications channel is a wireless cellular telephone system.

9. The method of claim 4, wherein:

the step of receiving ephemeris and almanac aiding information from said reference station is such that no z-count information is transferred from said reference station.

10. The method of claim 4, wherein:

the step of receiving ephemeris and almanac aiding information from said reference station is such that no timing information is transferred from said reference station.

* * * * *